Jan. 22, 1924.

S. A. McCLELLAN

MOLD FINISHING MACHINE

Filed Jan. 22, 1921

Inventor
Samuel A. McClellan

By
Lacey & Lacey, Attorneys

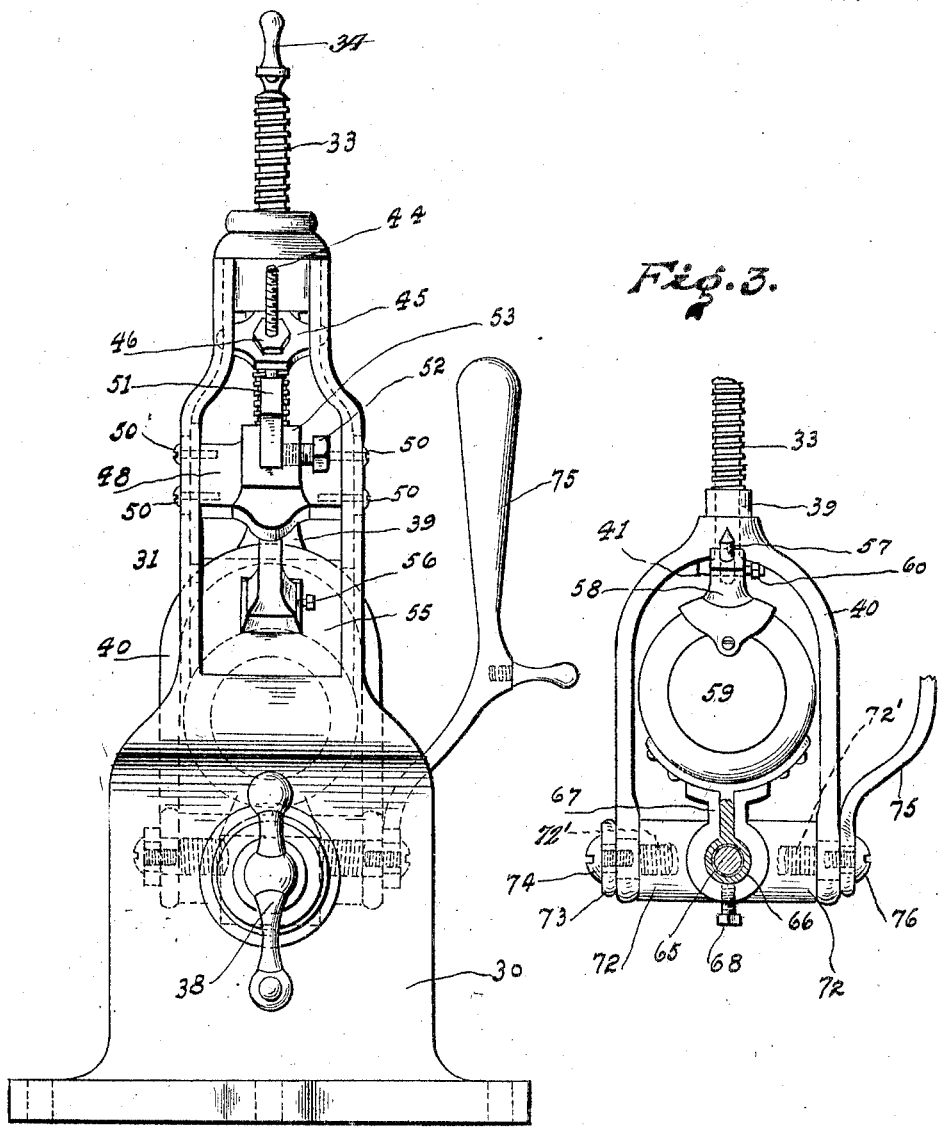

Jan. 22, 1924.
S. A. McCLELLAN
1,481,381
MOLD FINISHING MACHINE
Filed Jan. 22, 1921
3 Sheets-Sheet 3
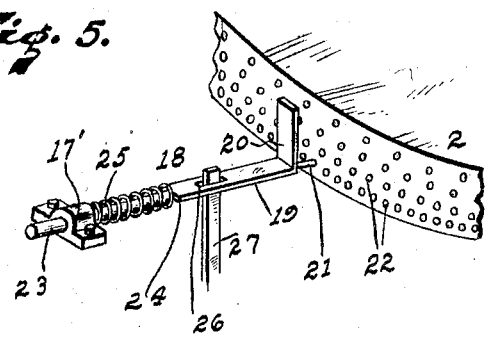
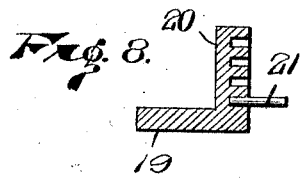
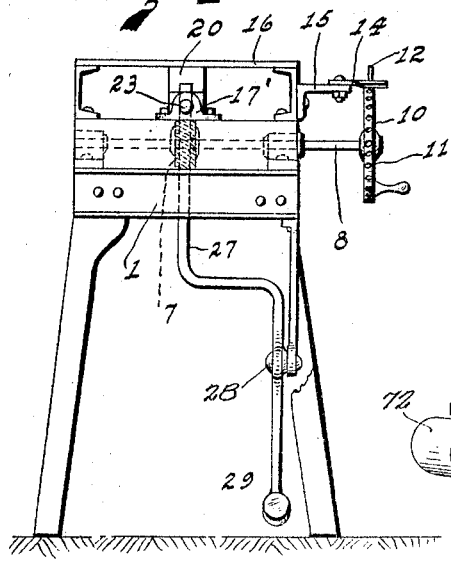
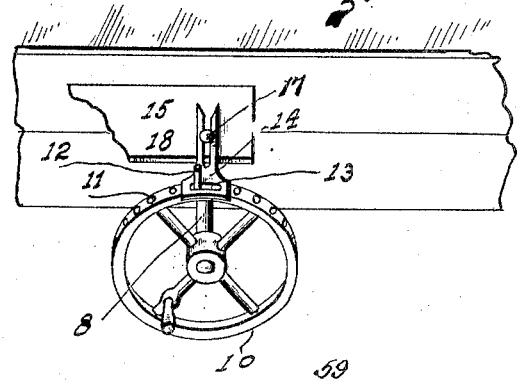
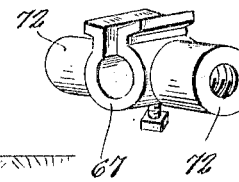
Inventor
Samuel A. McClellan
By
Lacey & Lacey, Attorneys Patented Jan. 22, 1924.

1,481,381

UNITED STATES PATENT OFFICE.

SAMUEL A. McCLELLAN, OF AKRON, OHIO.

MOLD-FINISHING MACHINE.

Application filed January 22, 1921. Serial No. 439,196.

*To all whom it may concern:*

Be it known that I, SAMUEL A. McCLELLAN, a citizen of the United States, residing at Akron, in the county of Summit and State of Ohio, have invented certain new and useful Improvements in Mold-Finishing Machines, of which the following is a specification.

This invention is a machine for finishing molds employed for the production of non-skid tires or tire armors and the primary object of the invention is to provide efficient means whereby all sharp corners and rough surfaces in the mold may be effectually eliminated. The invention further seeks to provide a machine for the stated purpose which may be adjusted to any size of mold and in which all chattering during the operation of the finishing tool will be overcome. The invention further includes means for regulating the feed of the table to the area of one unit of the design employed in the mold, and also includes means whereby the finishing tool may be easily caused to follow the design and may be readily adjusted to work upon a mold of any diameter. Other incidental objects of the invention will appear in the course of the following description.

In the drawings—

Fig. 2 is an end elevation of the main support with the parts mounted thereon;

Fig. 3 is a detail end view of the motor with the tool shaft and its bearing in transverse section;

Fig. 4 is a detail end view of a portion of the supporting frame;

Fig. 5 is a detail perspective view of the latch for holding the mold carrier or table against movement;

Fig. 6 is a detail perspective view of the means for controlling the feed or movement of the table or mold carrier.

Fig. 7 is a detail showing in perspective some of the parts appearing in Fig. 3.

Fig. 8 is a detail section of the end of the latch.

Figure 1:
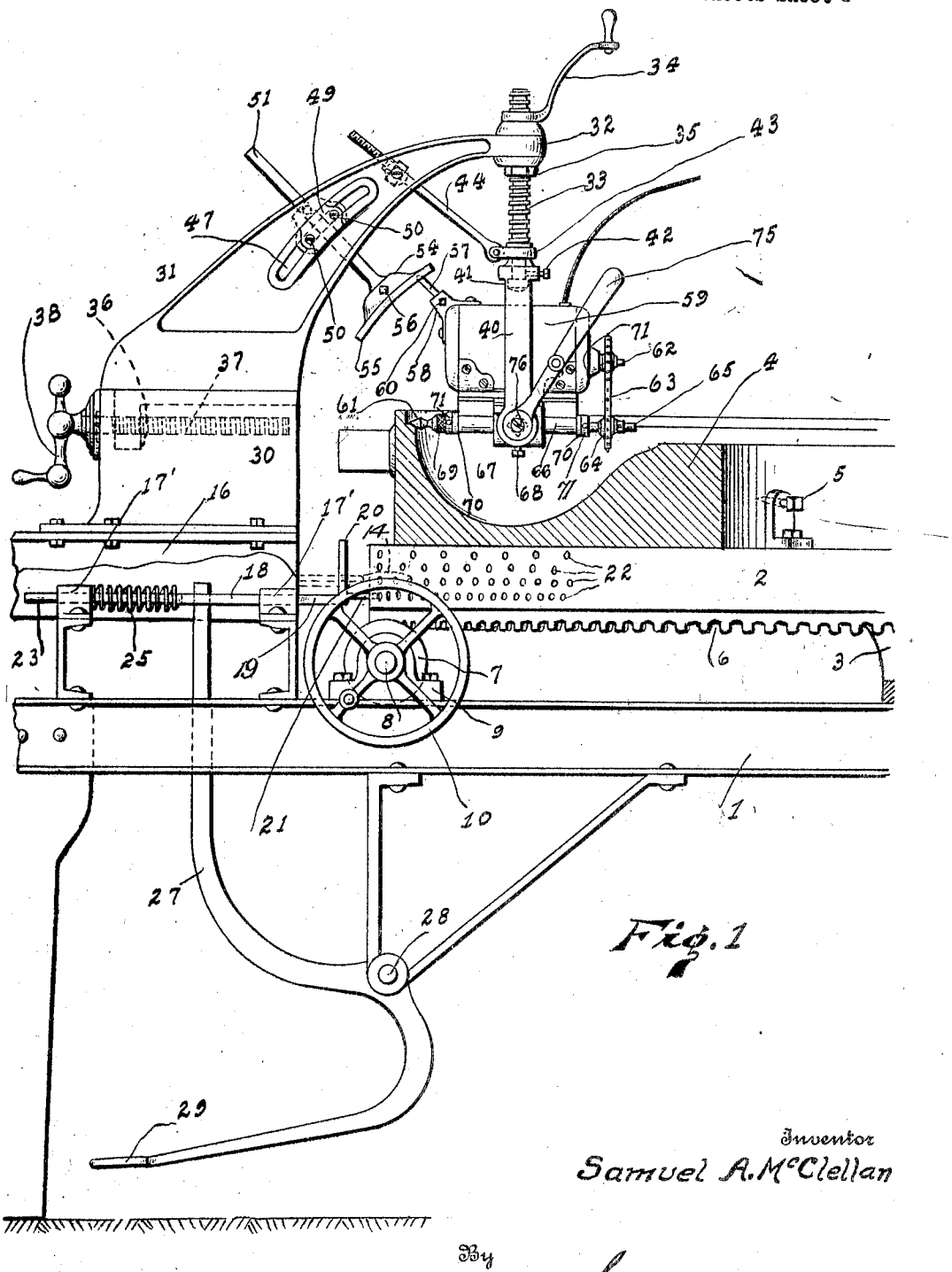
Figure 1 is a side elevation, partly broken away, of the apparatus, a portion of a mold being shown in section.

In carrying out the invention, I employ a supporting frame 1 which may be of any suitable construction and upon the said frame I pivotally mount a horizontal table or mold carrier 2, a portion of the pivot housing whereby the said table is supported being indicated at 3. The table or mold carrier is preferably circular and the mold 4 is placed directly upon the table and secured in concentric relation thereto by dogs 5 which are radially adjustable upon the table so as to accommodate molds of different diameters. On the under side of the table, at the edge thereof, I provide a rack 6 which is preferably a worm gear and meshes with a worm 7 upon a shaft 8 which is journaled in suitable bearings 9 upon the frame 1 and is equipped at its outer end with a hand wheel 10. The periphery of the wheel 10 is constructed with spaced sockets 11 adapted to receive a pin 12 which pin plays in a slot 13 in a stop plate 14 which is secured to a bracket 15 and projects from said bracket over the wheel, as shown in Fig. 6. The bracket 15 is secured to a base 16 upon the frame 1 at the end of the same, and the stop plate is adjutable upon the bracket by means of a bolt 17 inserted through a slot 18 in the plate and engaged in an opening in the bracket, as will be readily understood. Obviously, the movement of the wheel 10 is limited by the pin 12 coming into contact with the end of the slot 13 so that the table cannot be moved a distance greater than is necessary to feed the mold a distance corresponding to the size of one unit of the design in the mold. After the wheel 10 has been moved once, the pin 12 is shifted to the opposite end of the slot and engaged in another socket 11 so that upon the next movement of the wheel it will again serve as a stop. Of course, a plurality of stop plates 14 will be provided and they will be used interchangeably so that the size of the stop plate in use will be proportioned to the design in the particular mold being finished. Within the base 16, I provide bearings or guides 17' through which a latch 18 is slidably mounted. The said latch comprises a flat or angular forward portion 19 engaging the correspondingly shaped bearing 17', so as to be held against rotation about its longitudinal axis, and a head 20 at the outer ends of said flat portion, the said head being normally disposed adjacent the edge of the table or mold carrier 2. A pin 21 is adjustably fitted in the head 20 so as to project forwardly therefrom to engage in one of the openings or sockets 22 formed in the edge of the carrier and extending entirely around the same. As will be readily understood upon reference to Figs. 1 and 5, these sockets or openings 22 are arranged in a plurality of horizontal series, the spacing of the sockets in the different series varying so that the travel of the table or carrier may be regulated according to the size of the design being finished. In the illustrated arrangement, the sockets in the lowermost row or series are spaced more closely together than the sockets in any other row or series and, consequently, when the pin 21 is adjusted to engage said lowermost series of sockets, the table will be fed the minimum distance at each feeding operation. The latch is reduced in rear of the flat portion 19 and the reduced stem or shank 23 is circular in cross section, a shoulder or abutment 24 being thereby produced at the rear end of the flat portion 19. A spring 25 is coiled around the shank 23 between the bearing 17' and the said abutment or shoulder and tends normally to hold the latch projected so that the pin 21 will be engaged in one of the sockets 22. A slot or opening 26 is provided in the flat portion 19 of the latch and this slot is engaged by the upper end of a lever 27 which is fulcrumed upon the frame 1, as shown at 28, and is adapted to be oscillated by a treadle 29. When the table is to be moved, the treadle 29 is depressed thereby causing the lever 27 to swing rearwardly and withdraw the latch in opposition to the spring 25 so that the pin 21 will be released from the engaged socket 22 and the table may move. The table is moved by actuating the worm 7 through the hand wheel 10 and as soon as the socket which was engaged by the pin 21 has cleared the said pin the treadle is released, whereupon the spring 25 will project the latch and hold the end of said pin against the edge of the table and automatically engage the pin in the next succeeding socket when the movement of the table brings said socket into registry with the pin, as will be readily understood.

The sockets in the periphery of the hand wheel will be close together so that a single hand wheel may be used with a large variety of molds, but a plurality of hand wheels of various sizes may be provided and used interchangeably in the same manner that the stop plates 14 are interchangeably used. The stop plate is indicated in dotted lines in Fig. 1 in order to avoid confusion of lines, and it will be understood that the stop plate is arranged to lie close to the periphery of the hand wheel in order to avoid bending of the stop pin and also obtain the proper accurate cooperation of the stop plate and the hand wheel. The stop pin 12 is, of course, located at the rear end of the slot 13 considered in the direction of movement of the hand wheel so that, when the hand wheel is rotated, the pin will be carried to and against the front end of the slot and thereby arrest the movement of the hand wheel, at which time the pin 21 will engage a socket 22. The pin 12 is then withdrawn and engaged in the socket which will then be exposed at the rear end of the slot 13.

Upon the base 16, I rigidly secure a foot or block 30 upon which is mounted a standard or truss arm 31 which extends forwardly as well as inwardly so that its upper extremity 32 will be vertically over the mold. The said extremity 32 of the standard is formed into an eye through which a threaded bar 33 is passed, a crank 34, having one end internally threaded, being engaged on said threaded bar above the eye 32 so as to effect vertical movement of the bar in an obvious manner. A lock nut 35 is fitted upon the bar against the under side of the terminal 32 so as to hold the said bar in the position to which it may be adjusted. In order to accommodate the position of the standard to molds of different sizes, the lower end of the standard is slidably mounted upon the foot or block 30 which is hollow, and a lug or nut 36 depends from the end of the standard within the foot to be engaged by a threaded bar 37 swiveled at its rear end in the end wall of the foot and equipped with a lever or other form of handle, as indicated at 38. It will be readily understood that by rotating the handle 38, the threaded bar 37 will act upon the nut 36 to effect sliding movement of the standard upon the foot 30 so that the terminal 32 of the standard will be readily brought to proper position over the mold.

The lower end of the threaded bar 33 is reduced and smooth to pass through a sleeve or collar 39 at the upper end of an inverted U-shaped frame or hanger 40, a nut 41 or its equivalent being fitted upon the lower extremity of the said bar 33 against the under side of the top of said hanger so as to sustain the hanger on the bar. The hanger will thus be swiveled upon the bar so that it may be easily rotated about the same as will be readily understood, and a set screw 42 is mounted in the upper end of the hanger and adapted to be turned home against the reduced smooth portion of the bar so as to hold the hanger stationary when desired. A collar 43 is engaged about the sleeve 39 of the hanger and to the said collar I pivot the lower forward end of a brace 44 which extends through the upper portion of the standard 31, as shown, it being readily understood that the standard is an open frame, as shown most clearly in Fig. 2, so as to permit the said brace bar and the pattern-carrying arm to be disposed centrally of the standard and firmly supported. The brace bar 44 extends loosely through a block 45 which is pivoted at its ends in the side walls of the standard and a nut 46 is fitted on the upper threaded extremity of the brace and adapted to be turned home against the said block 45 so as to hold the bar in a set position and permit it to be readily adjusted to conform to the adjustment of the bar 33 and the hanger 40. Below the block 45, the standard 31 is constructed in its sides with arcuate slots 47 to facilitate the support and adjustment of the pattern carrier. The said carrier consists of a block 48 fitted between the sides of the standard and cheek plates 49 fitted against the outer sides of the standard and connected with the said block 48 by screws 50 inserted through the cheek plates and the slots 47 into the ends of the block 48. The carrier is completed by an arm or bar 51 inserted through the block 48 and adjustably secured thereto by a set screw 52 inserted through one side of a socket 53 on the block 48 and bearing against the side of said bar, as will be readily understood on reference to Fig. 2. The arm or bar 51 extends downwardly and forwardly beyond the standard and has its lower end engaged in a socket 54 in the upper side of the pattern plate 55, a set screw 56 mounted in the side of said socket and engaging the end of the arm serving to secure the pattern plate firmly to the arm. It will be readily understood that the pattern plate is in the nature of a die having in its lower face the same design which is to be formed in the mold and a tracer is caused to follow the grooves and lines of the design in the pattern plate so that the cutter or finishing tool which is connected with the tracer by mechanism presently described will follow a corresponding path and duplicate the design in the mold. The tracer consists of a pin 57 fitted in a socket 58 on the upper rear corner of a motor 59 and held in said socket by a set screw 60, as will be readily understood.

The motor 59 is mounted in the hanger 40 and is preferably an electric motor of sufficient power to positively drive the cutter or finishing tool, indicated at 61. The motor shaft 62 is equipped with a sprocket wheel and a chain 63 is trained around the said sprocket wheel and a sprocket 64 on the cutter shaft 65. The cutter shaft 65 is rotatably mounted in a sleeve 66 which is fitted through a yoke 67 and is firmly secured to the motor casing, as shown. The sleeve 66 is adjustable endwise through the said yoke 67 and is secured in a set position therein by a set screw 68 mounted in the bottom of the yoke and bearing against the sleeve, as will be readily understood. The tool 61 is carried by a chuck 69 which may be fitted upon the shaft 65 in any convenient manner and bushings 70 are fitted in the ends of the sleeve 66 around the shaft 65 so as to prolong the life of the bearings. Collars 71 are secured upon the shaft 65 against the ends of the bushings 70 and the hub of the sprocket 64 is likewise secured to the shaft by a set screw so that if the several set screws be loosened the shaft may be adjusted endwise through the collars, the bushings, and the sprocket wheel, and the cutter thereby set to work at a greater or less distance from the end of the sleeve 66. The yoke 67 is provided with lateral bosses 72 preferably midway its ends and at diametrically opposite points. These bosses fit closely but easily within the lower end of the hanger 40 and receive stud shafts 72' which have smooth circular portions passing through and journaled in the ends of the hanger so that they will permit relative pivotal movement of the bosses and the hanger. A washer 73 is fitted against one side of the hanger and a screw 74 inserted through the said washer into the stud shaft secures the washer against dislodgment, it being understood that the inner portion of the stud shaft is threaded so that it will be readily secured in the threaded socket or bore of the respective boss 72. At the opposite side of the hanger, I provide a lever or handle 75 which has its lower end disposed against the side of the hanger, as shown clearly in Fig. 3, and performs the function of a washer, being held against displacement by a screw 76 corresponding in all respects to the screw 74. By manipulating the handle or lever 75, the motor may be shifted in both horizontal and vertical planes so that the tracer 57 will be caused to follow the design in the pattern plate 55 and obviously the cutter 61 will follow a similar path in the mold.

The pattern plate may be changed at will so that any desired design may be produced or finished in the mold and to change the pattern plate it is necessary merely to remove the set screw 56 and insert it in the substituted pattern plate. In a similar manner, the tracer pin 57 may be removed and a new pin substituted therefor when the pin has become worn to such an extent that it cannot be longer properly used. Inasmuch as the hanger 40 may be pivotally swung about its swiveled connection with the threaded bar 33 and the motor-supporting body 67 may be rocked about the stub shaft 72', it is obvious that the most intricate design can be readily followed by the tracer and the corresponding form cut in the mold by the tool 61.

It is thought the operation of the apparatus will be readily understood from the foregoing description, taken in connection with the accompanying drawings, and it will be readily noted that I have provided an apparatus by which the work of finishing a mold may be expeditiously performed.

The mechanism is not unduly complicated and may be produced and installed at a low cost.

Having thus described the invention, what is claimed as new is:

1. The combination of a pattern plate, means for holding said pattern plate stationary, a swiveled hanger, a supporting body mounted in said hanger for rocking movement, a motor carried by said body, a tracer mounted on the motor and engaging the pattern plate, and a tool carried by the said supporting body and operatively connected with the motor.

2. The combination of a standard, a pattern plate supported in the standard, a vertically adjustable bar mounted in the upper end of the standard, a hanger swiveled on the lower end of said bar, a motor mounted in the hanger for rocking movement, a tracer carried by the motor and engaging the pattern plate, a tool carried by the motor support and operatively connected with the motor, and an adjustable brace pivotally connected with the said vertically adjustable bar and passing through and supported by the standard.

3. The combination of a standard, a vertically adjustable bar mounted in the upper extremity of the standard, a hanger swiveled on the lower end of said bar, a motor carried by said hanger, a tool connected with the motor, a pattern plate supported on the standard, a tracer connected with the motor and engaging said pattern plate, a block pivotally mounted within the standard, a collar fitted around the upper end of said hanger, a brace pivoted at its lower end to said collar and extending through the block pivoted within the standard, and a stop adjustably mounted upon the said brace and bearing upon the upper side of the said pivoted block.

4. The combination of a standard, a carrier secured in the standard and adjustable through and along the same, a pattern plate detachably secured to the carrier, a tool adapted to act upon a mold disposed below the pattern plate, and a tracer engaging the pattern plate and connected with the tool whereby the movement of the tracer will be duplicated by the tool.

5. The combination of a standard having slots in its sides, a carrier consisting of a plate disposed between the sides of the standard, and cheek plates fitted against said sides, fastening devices inserted through said cheek plates and through the slots in the standard into the ends of the plate, an arm adjustably secured in said plate, a pattern plate detachably secured upon the end of said arm, a tracer engaging the pattern plate, and a mold-treating tool connected with said tracer whereby the travel of the tracer will be duplicated by the tool.

6. The combination of a pattern plate, a hanger, a motor support pivotally mounted in the lower end of the hanger, a motor on said motor support, a tracer carried by the motor and engaging the pattern plate, a cutter shaft supported in and extending through the motor support and operatively connected with the motor, and a tool carried by said cutter shaft.

7. The combination of a pattern plate, a hanger mounted for turning movement on a vertical axis, a motor-supporting body mounted in the lower end of the hanger for turning movement on a horizontal axis, a tracer carried by the motor and engaging the pattern plate, a bearing sleeve inserted through the motor-supporting body at a right angle to the pivotal support of the same, bushings fitted in the face of said bearing sleeve, a cutter shaft inserted through said sleeve and said bushings, a tool carried by said shaft, a sprocket adjustably secured to the shaft and operatively connected with the motor, and collars adjustably secured to the shaft adjacent and bearing against the ends of the bushings.

8. The combination of a rotatable table, means for securing a mold thereon, a support disposed at one side of the table and overhanging the same, a cutter arranged to engage the mold, means for suspending the cutter from the overhanging support for pivotal movement in intersecting planes, a pattern plate on the support, and means whereby the cutter may be operated and caused to travel in a path defined by the pattern plate.

9. The combination of a rotatable table, means for securing a mold thereon, a support arranged beside and overhanging the table, a pattern plate mounted on said support above the table, a cutter suspended from said support in position to act on a mold secured upon the table, and means for operating the cutter and causing it to follow a path defined by the pattern plate.

In testimony whereof I affix my signature.

SAMUEL A. McCLELLAN. [L. S.]